(12) United States Patent
Ji et al.

(10) Patent No.: US 11,768,814 B2
(45) Date of Patent: Sep. 26, 2023

(54) DATA TRANSMISSIONS BETWEEN TWO DATABASES

(71) Applicant: SAP SE, Walldorf (DE)

(72) Inventors: Hong-zhu Ji, Shanghai (CN); Tianlun Chen, Shanghai (CN); Ying Li, Shanghai (CN); Ning Li, Xi'an (CN); Hu Yin, Shanghai (CN); Zhan-feng Ma, Shanghai (CN); Jian-ping Hui, Xi'an (CN)

(73) Assignee: SAP SE, Walldorf (DE)

( * ) Notice: Subject to any disclaimer, the term of this patent is extended or adjusted under 35 U.S.C. 154(b) by 176 days.

(21) Appl. No.: 17/216,974

(22) Filed: Mar. 30, 2021

(65) Prior Publication Data
US 2022/0318211 A1    Oct. 6, 2022

(51) Int. Cl.
*G06F 16/21* (2019.01)
*G06F 7/08* (2006.01)
*G06F 16/22* (2019.01)

(52) U.S. Cl.
CPC ............ *G06F 16/214* (2019.01); *G06F 7/08* (2013.01); *G06F 16/2282* (2019.01)

(58) Field of Classification Search
CPC .................................................. G06F 16/214
USPC .......................................................... 707/703
See application file for complete search history.

(56) References Cited

U.S. PATENT DOCUMENTS

| | | | |
|---|---|---|---|
| 7,620,665 B1 | 11/2009 | George et al. | |
| 9,953,033 B2 | 4/2018 | Weinberger et al. | |
| 9,996,562 B2 | 6/2018 | Higginson et al. | |
| 10,635,718 B1* | 4/2020 | Shandilya | G06F 16/23 |
| 10,691,654 B2 | 6/2020 | Higginson et al. | |
| 2008/0010342 A1* | 1/2008 | Gebhardt | H04L 67/53 709/204 |
| 2008/0301162 A1* | 12/2008 | Wall | G06F 16/258 |
| 2011/0167037 A1 | 7/2011 | Kaiser | |
| 2015/0019488 A1* | 1/2015 | Higginson | G06F 16/214 707/634 |
| 2016/0150187 A1* | 5/2016 | Fadili | H04N 7/157 348/14.08 |

(Continued)

OTHER PUBLICATIONS

Best practices for AWS Database Migration Service, Amazon Web Services, Inc., printed Oct. 7, 2020 from https://docs.aws.amazon.com/dms/latest/userguide/CHAP_BestPractices.html, 8 pages, 2020.

(Continued)

*Primary Examiner* — Muluemebet Gurmu
(74) *Attorney, Agent, or Firm* — Sterne, Kessler, Goldstein & Fox P.L.L.C.

(57) ABSTRACT

Disclosed herein are system, method, and computer program product embodiments for database management coordinators operated by a source server and a target server, respectively. The database management coordinator can be in a state selected from an initial state, a ready state, a transmission state, or a pause state. The database management coordinator operated by the source server can extract data in a first format stored in a first storage device and convert the data in the first format into a second format to be transmitted to the target serer. The database management coordinator operated by the target server can convert the data in the second format into a third format to be stored in a third storage device associated with the target server.

20 Claims, 8 Drawing Sheets

(56) References Cited

U.S. PATENT DOCUMENTS

2018/0165286 A1* 6/2018 Ranganathan ....... G06V 10/955
2020/0327124 A1* 10/2020 Rosen .................... G06F 9/505
2021/0342316 A1* 11/2021 McPherson ........... G06F 16/258

OTHER PUBLICATIONS

Migrating Data To SAP ASE on AWS, Document Version 1.0, SAP SE, 20 pages, Jun. 12, 2019.
SAP HANA Remote Data Sync: Server Administration Guide, Document Version 1.0, SAP SE, 378 pages, Apr. 5, 2019.

* cited by examiner

| Magichead (2 bytes) | Chksum (2 bytes) | Dbid (2 bytes) | Spare (2 bytes) |
|---|---|---|---|
| Source object id (4 bytes) | | Source partition id (4 bytes) | |
| Buffer type (4 bytes) | | Buffer status (4 bytes) | |
| Total byte (4 bytes) | | Total bytes of data (4 bytes) | |
| Status (1) | Row data (variable length) | | |
| Status (1) | Row data (variable length) | | |
| ⋮ | ⋮ | | |

FIG. 1B

DATA TRANSMISSIONS BETWEEN TWO DATABASES

A database is an organized collection of data, generally stored and accessed electronically from a computer system. A database model is a type of data model that determines the logical and operational structure of a database, e.g., the manner data can be stored, organized, and manipulated. An example of a database model is the relational model, which uses a table-based format. There are other database models as well. A database management system (DBMS) is a software that interacts with end users, applications, and the database itself to capture and analyze the data. The DBMS software additionally encompasses the core facilities provided to administer the database. A database system can include the database, the DBMS, and the associated applications.

Database migration is a process of migrating data from one or more source databases to one or more target databases. During database migration, data are transmitted between two databases. Database migration can be used to move a local database to a cloud-based database to save money, to move to a particular database system having some particular database features, to update the legacy systems, or other applications. However, database migration still has significant performance issues and reliability issues to be resolved.

BRIEF DESCRIPTION OF THE DRAWINGS

The accompanying drawings are incorporated herein and form a part of the specification.

FIG. 1B is a diagram illustrating a data format including a message header to be transmitted from a source server to a target server during database migration, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for data transmissions between two databases residing at a source server and a target server managed by their respective database management coordinators. A database can be built based on a database model, operated on a computing platform, and often accessed through a network connection. Data can be stored in the database in a specific format determined by the database model and/or the computing platform. A business may want to migrate a database residing in one platform or location to another database residing in a different platform or location for various business or security purposes. For example, due to the economic and security benefits (or other reasons), a business may migrate an on premise database to a database stored and managed in a cloud computing environment. During the database migration process to transmit data from a first database to a second database, the format of the data can often be changed. For example, when a relational data model is used, a data format of a first database may have a page size, charset, or sort order that is different from the data format of a second database.

Some existing utilities to migrate data from a database operated on a source server to a database operated on a target server may suffer from various performance issues. For example, the source server may stop any write operations to the source database to guarantee the data integrity of the source database. In addition, a network connection between a source server and a target server may be interrupted by various network communication issues, leading to interruption to the database migration from the source server to the target server.

In some embodiments, a database management coordinator can be operated by the source server and the target server, respectively. The database management coordinator can be a part of a database management system (DBMS) or a component separated from the DBMS. The database management coordinator can be in various states, e.g., an initial state, a ready state, a transmission state, a pause state, or other states. When there is any interruption caused by the communication between the source server and the target server, or any other causes, the database management coordinator can enter the pause state, and keep a status of the data being transmitted from the source server and the target server. Afterwards, the database management coordinator can resume the database migration based on the saved status. Hence, compared to the approach to restart the database migration from the source server to the target server when an interruption happens, embodiments herein can save time and effort. Accordingly, the reliability and performance of database migration are improved.

Figure 1A:
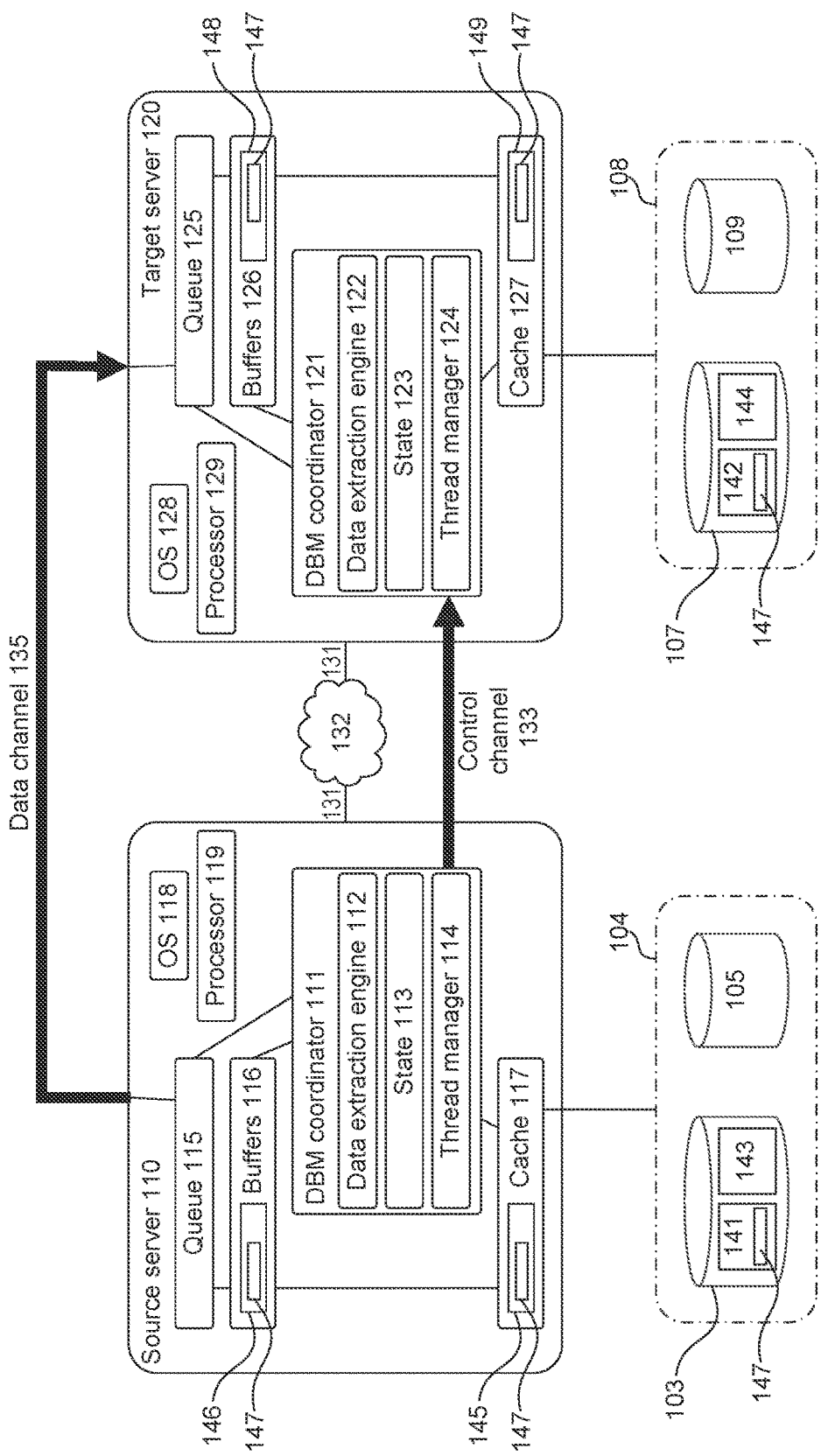
FIG. 1A is a block diagram illustrating a system for data transmissions between two databases residing at a source server and a target server, according to some embodiments.

FIG. 1A is a block diagram illustrating a system 100 for data transmissions between two databases residing at a source server and a target server, according to some embodiments. In some embodiments, system 100 includes a source server 110 and a target server 120 communicatively coupled together by a communication link 131. The communication link 131 may go through a cloud computing system 132. In some embodiments, target server 120 can reside in cloud computing system 132. A database management coordinator 111 is operated by source server 110, and database management coordinator 121 is operated by target server 120, to work together to coordinate the database migration of a database 103 attached to source server 110 to a database 107 attached to target server 120. Through multiple operations managed by database management coordinator 111 and database management coordinator 121, data 147 stored in database 103 is transmitted to and stored in database 107.

In some examples, system 100 can include a network formed by source server 110, target server 120, and cloud computing system 132. For example, system 100 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some examples, cloud computing system 132 can include an environment that delivers computing as a service or shared resources, services, etc. Cloud computing system 132 can provide computation, software, data access, storage, and/or other services that do not require end-user knowledge of a physical location and configuration of a system and/or a device that delivers the services. In some examples, cloud computing system 132 can include Amazon® Web Services (AWS), Microsoft® Azure, Google® Cloud, IBM® Cloud, Oracle® Cloud Infrastructure, or any other cloud computing system.

In some examples, source server 110 and target server 120 can include a server device (e.g., a host server, a web server, an application server, a database server etc.), a data center device, a desktop workstation, an embedded system, or a similar device. Source server 110 can be communicatively coupled to target server 120 by communication link 131, which can be a wireless link or a wired line. In some other examples, source server 110 and target server 120 can be implemented on a same machine. There can be various implementations of system 100 including source server 110 and target server 120.

In some examples, source server 110 can include processor 119, operating system 118, and a secondary storage 104 communicatively coupled to processor 119. In addition, source server 110 can include a cache 117, buffer 116, and transmission queue 115. Secondary storage 104, cache 117, buffer 116, and transmission queue 115 are examples of a storage hierarchy with various sizes and speeds. For example, secondary storage 104 can have the largest size, but may have the slowest speed. Cache 117 can reside in a main memory, and can have a smaller size than secondary storage 104 but faster speed. Buffer 116 and transmission queue 115 can be registers, which can have the smallest size and fastest speed. There can be many other kinds of storage hierarchy to perform the same functions as described herein. For example, secondary storage 104 can be a part of main memory for source server 110. Secondary storage 104 can store one or more database, e.g., database 103 and a database 105. A database management coordinator 111 can be operated by source server 110. Database management coordinator 111 can include a data extraction engine 112, thread manger 114 to manage multiple thread operations, and a set of state 113 where database management coordinator 111 can be operated in.

Similarly, target server 120 can include processor 129, operating system 128, secondary storage 108 communicatively coupled to processor 129, cache 127, buffer 126, and transmission queue 125. Secondary storage 108 can store one or more database, e.g., database 107 and a database 109. A database management coordinator 121 can be operated by target server 120. Database management coordinator 121 can include a data conversion engine 122, thread manger 124 to manage multiple thread operations, and a set of state 123 where database management coordinator 121 can be operated in.

Database management coordinator 111 at source server 110 and database management coordinator 121 at target server 120 can work together to coordinate the database migration of database 103 attached to source server 110 to database 107 attached to target server 120. Database 103 can be a source database that contains data to be migrated to one or more target databases. Database 107 can be a target database that receives data migrated from one or more source databases, e.g., database 103. Database management coordinator 111 at source server 110 can communicate with database management coordinator 121 at target server 120 by a control channel 133. In addition, data can be transmitted through a data channel 135 between transmission queue 115 and transmission queue 125. Data channel 135 and control channel 133 can be logic channels, and can be implemented by the communication link 131. There are other components, e.g., database management system (DBMS) that interacts with end users, applications, and the database itself to capture and analyze the data for database 103 or database 107, not shown.

Database 103 or database 107 can be built based on a database model, e.g., relational model, an object-oriented model, or other database model. Description herein can use a relational model as an example, which uses a table-based format. For example, database 103 can include a data table 141 and a data table 143, while database 107 can include a data table 142 and a data table 144. When a relational data model is used, a data format of a first database, e.g., database 103, may have a first page size, first charset, or first sort order that is different from the data format of a second database, e.g., database 107. Database 103 or database 107 can be implemented in various language or by various vendors, e.g., Oracle®. MySQL, PostgreSQL, Spanner, or others. In addition, descriptions and functions provided herein are not limited to databases of relational model. The functions can be applicable to databases of other models, with little or no changes to the implementation. Some databases can be multi-model databases supporting different data models, e.g., Oracle®, MySQL, or PostgreSQL.

In some examples, a data migration from a source database, e.g., database 103, to a target database, database 107, can be a homogeneous migration, when the source and target databases are of the same database management system from the same provider. For example, homogeneous migrations can include data migrations from a MySQL database to a MySQL database, or from an Oracle® database to an Oracle® database, from a self-hosted PostgreSQL to a managed version of itself such as a variant Cloud SQL. In a homogenous database migration, the schemas for the source and target databases are likely identical. If the schemas are different, the schemas from the source databases can be transformed during migration.

In some examples, a data migration from a source database, e.g., database 103, to a target database, e.g., database 107, can be a heterogeneous migration, when the source and target databases are of different database management systems or database models. For example, heterogeneous migrations can include migrations from an Oracle® database to Spanner database. Heterogeneous migration can be between the same data models (for example, from relational to relational), or between different data models (for example, from relational to key-value data model). During the heterogeneous migration process, to transmit data from a first database to a second database, the format of the data can be changed from a data format of the first database to a data format of the second database. Embodiments described herein can include both heterogeneous migrations and homogeneous migrations.

In some embodiments, data 147 can be stored in a row of data table 141, or in a row of data table 143, or in database 105. Data 147 can be stored in database 103 in a first format with a first page size of a first page of a first data table, a first charset, or a first sort order for the first data table. The first page size of the first page of the first data table can be of a size of 1 k=$2^{10}$, 2 k=$2^{11}$, 4 k=$2^{12}$, 8 k=$2^{13}$, 16 k=$2^{14}$, or some other sizes. The sizes provided here are merely examples, and are not limiting.

In some embodiments, data 147 can be read into and stored in cache 117, e.g., stored in a page 145. Data 147 stored in page 145 can have the first format as when data 147 is stored in database 103. Once data 147 is read into cache 117, database 103 can be updated by other users or applications. Hence, write operations to database 103 do not need to be blocked, and database 103 can still be updated at the same time when data 147 is being migrated from database 103 to database 107 stored in target server 120. The updated data during the migration process can be marked and migrated later at a catchup phase.

Furthermore, data 147 can be extracted from page 145 by data extraction engine 112. Data extraction engine 112 can read data 147 in page 145, row by row within a data table, and then data table by data table, in an organized way. For example, data 147 can include data in a first row of a first data table, a second row of the first data table, or a second data table of database 103. In some embodiments, data extraction engine 112 can extract data 147 in parallel by multiple threads managed by thread manager 114 of database management coordinator 111. During the data extraction operations, data extraction engine 112 can further convert data 147 into a second format, e.g., a message format contained in a message, and store the message into buffer 116, e.g., message 146. Afterwards, message 146 is to be transmitted from buffer 116 to buffer 126 of target server 120 to be further processed by target server 120.

FIG. 1B is a diagram illustrating a data format for message 146 including data 147 and a message header 151, which can be viewed as a second format for data 147 stored in buffer 116. Message header 151 can include various components, e.g., a checksum, a database identifier, source object identifier, source partition identifier, buffer status, size of data 147, and other information. As shown in FIG. 1B, message header 151 can include 32 bytes. In some other examples, message header 151 can be a different size.

Figures 2A, 2B:
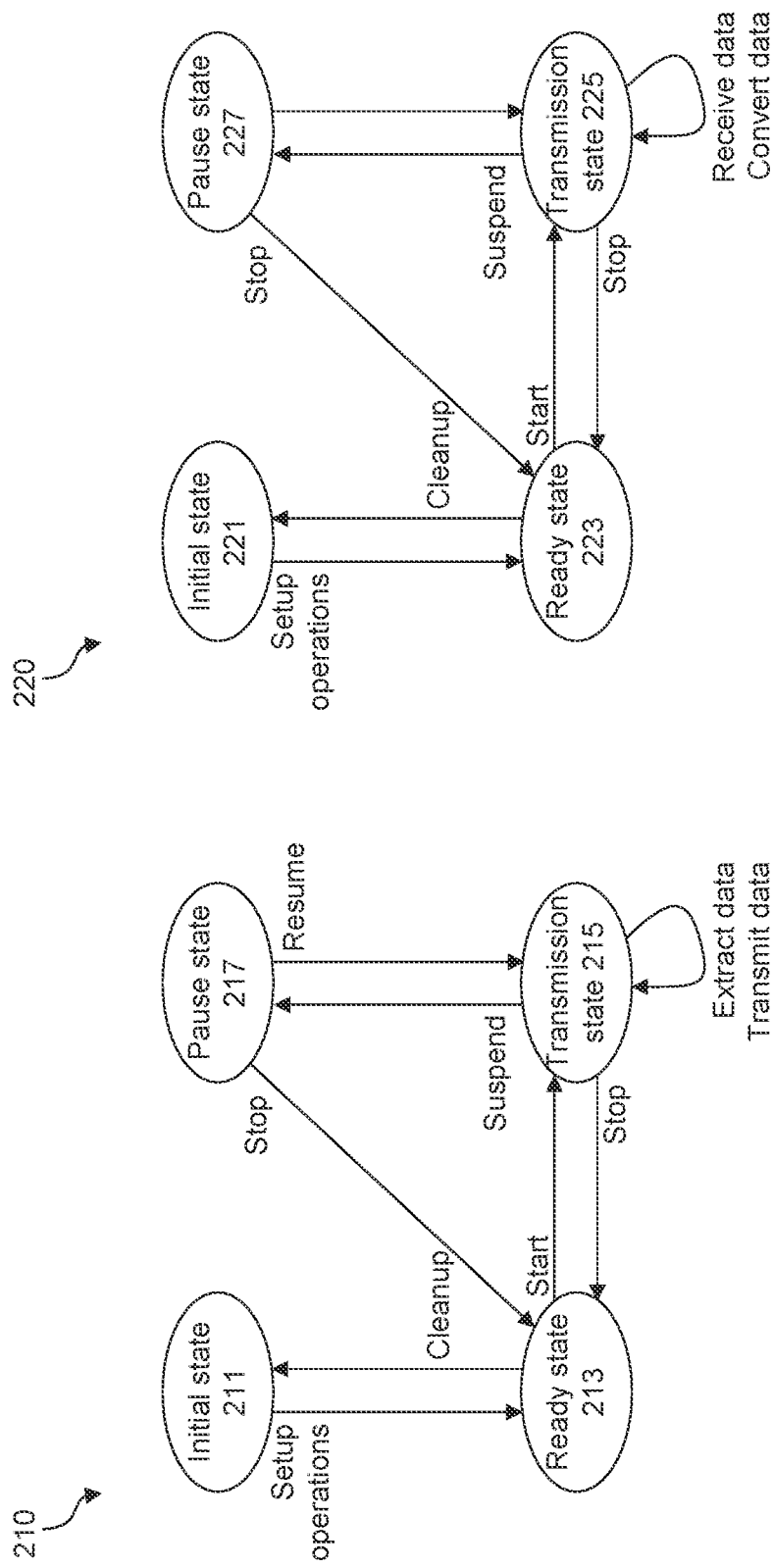
FIGS. 2A-2B are state diagrams illustrating various states for database management coordinators of a source server and a target server, according to some embodiments.

Referring back to FIG. 1A, in some examples, database management coordinator 111 of source server 110 can be in various state 113, e.g., a state selected from an initial state, a ready state, a transmission state, or a pause state, with more details shown in FIG. 2A. Similarly, database management coordinator 121 of target server 120 can be in various state 123, e.g., a state selected from an initial state, a ready state, a transmission state, or a pause state, with more details shown in FIG. 2B.

In some examples, when database management coordinator 111 is in a ready state or a transmission state, data extraction engine 112 can extract data 147 from page 145, and convert it into the second format contained in message 146 that is stored in buffer 116. When database management coordinator 111 is in the transmission state, message 146 can be transmitted through data channel 135 to target server 120, and saved into buffer 126 as message 148.

In some examples, when database management coordinator 111 is in the transmission state, message 146 can be transmitted into transmission queue 115, and further pass through data channel 135 to reach transmission queue 125 at target server 120. Afterwards, message 146 can be saved into buffer 126 as message 148 containing data 147.

In some examples, at target server 120, when database management coordinator 121 is in the transmission state, data conversion engine 122 can convert data 147 in the second format contained in message 148 into a third format contained in a page 149 stored in cache 127. Data conversion engine 122 can convert data 147 in the second format into the third format contained in page 149 by multiple parallel threads managed by thread manager 124 of database management coordinator 121. Data 147 in the third format can further be stored into data table 142 contained in database 107. Data 147 contained in page 149 or data table 142 can have a second page size of a second page of a second data table, a second charset, or a second sort order for data table 142 contained in database 107. The second page size of a second page of a second data table, a second charset, or a second sort order for data table 142 contained in database 107 can be different from the first page size of the first page of the first data table, the first charset, or the first sort order for the first data table, e.g., data table 141 of database 103.

FIG. 2A illustrates a state diagram 210 including various states for database management coordinator 111 of source server 110, while FIG. 2B illustrates a state diagram 220 including various states for database management coordinator 121 of target server 120. State diagram 210 includes an initial state 211, a ready state 213, a transmission state 215, or a pause state 217. State diagram 220 includes an initial state 221, a ready state 223, a transmission state 225, or a pause state 227. State diagram 210 and state diagram 220 are shown as examples, and are not limiting. There can be other number of states, and the states can be referred to as different names, while perform similar functions.

In some examples, as shown in FIG. 2A, when database management coordinator 111 is in initial state 211, database management coordinator 111 can perform setup operations to allocate resources for extracting the data in the first format. For example, database management coordinator 111 can allocate resources, e.g., buffer 116, for extracting data 147 in the first format stored in page 145, and convert data 147 into the second format contained in message 146, and further store message 146 into buffer 116. In addition, database management coordinator 111 can allocate resources for transmitting data in the second format from the source server to the target server. For example, database management coordinator 111 can allocate resources, e.g., transmission queue 115, for transmitting data 147 in the second format contained in message 146. Database management coordinator 111 can further set up, a data connection, e.g., data channel 135, between source server 110 and target server 120. After the resources, e.g., buffer 116, transmission queue 115, have been allocated and the data connection, e.g., data channel 135, has been setting up, database management coordinator 111 can enter ready state 213.

In some examples, when database management coordinator 111 is in ready state 213, database management coordinator 111 can enter transmission state 215 when a start signal is received. The start signal can be an input from a user or an administrator, a control signal from a timer, or any other control signal.

In some examples, when database management coordinator 111 is in transmission state 215, database management coordinator 111 can extract data 147 stored in page 145 in the first format, convert data 147 into the second format contained in message 146, and further store message 146 into buffer 116. In addition, database management coordinator 111 can further transmit data 147 in the second format contained in message 146 to target server 120. Target server 120 can receive data 147 contained in the message and save it as message 148, and further convert data 147 into the third format contained in page 149.

In some examples, when database management coordinator 111 is in transmission state 215, database management coordinator 111 can receive an indication, e.g., a suspend signal, to enter pause state 217. When database management coordinator 111 receives such an indication, database management coordinator 111 can suspend operations being performed. For example, database management coordinator 111 can suspend extracting data 147 in the first format stored in page 145, suspend transmitting data 147 contained in message 146 to target server 120, and further store a status of data 147 being transmitted in message 146. Other status, such as the status of the transmission queue 115, the status of page 145 can be saved as well. After saving the status, database management coordinator 111 can enter pause state 217 from transmission state 215.

In some examples, when database management coordinator 111 is in pause state 217, database management coordinator 111 can receive an indication, e.g., a resume signal, to enter transmission state 215. Once such an indication is received, database management coordinator 11 can restore the status of data 147 being transmitted in message 146, and any other saved status, and further enter transmission state 215 from pause state 217. Once in transmission state 215, database management coordinator 111 can transmit data 147 in message 146 to target server 120.

In some examples, when database management coordinator 111 is in pause state 217 or transmission state 215, database management coordinator 111 can receive an indication, e.g., a stop signal, to enter ready state 213. Once such an indication is received, database management coordinator 111 can stop extracting data 147 from page 145, and stop transmitting data 147 contained in message 146 to target server 120, and enter ready state 213.

In some examples, when database management coordinator 111 is in ready state 213, database management coordinator 111 can receive an indication, e.g., a cleanup signal, to enter initial state 211. Once such an indication is received, database management coordinator 111 can free the allocated resources for extracting data 147 and resources for transmitting data 147, e.g., buffer 116 and transmission queue 115. In addition, database management coordinator 111 can disconnect data channel 135, and enter initial state 211 after the resources have been freed and the data channel has been disconnected.

In some examples, as shown in FIG. 2B, when database management coordinator 121 is in initial state 221, database management coordinator 121 can perform setup operations to allocate resources for receiving data and allocate resources for converting the received data into a format to be stored in a target database. For example, database management coordinator 121 can allocate transmission queue 125 for receiving data 147 contained in message 146, and further allocate buffer 126 to save the received message as message 148. Message 148 saved in buffer 126 can be used to convert data 147 contained in message 148 into a third format saved into cache 127. Database management coordinator 121 can further set up, a data connection, e.g., data channel 135, between source server 110 and target server 120. After the resources, e.g., buffer 126, transmission queue 125, have been allocated and the data connection, e.g., data channel 135, has been setting up, database management coordinator 121 can enter ready state 223.

In some examples, when database management coordinator 121 is in ready state 223, database management coordinator 121 can enter transmission state 225 when a start signal is received. The start signal can be an input from a user or an administrator, a control signal from a timer, or any other control signal.

In some examples, when database management coordinator 121 is in transmission state 225, database management coordinator 121 can receive data 147 in the second format contained in message 146 from source server 110, and store data 147 and received message into buffer 126 to be message 148. Database management coordinator 121 can further convert data 147 contained in message 148 into a third format, and store data 147 in the third format into page 149 of cache 127. At this stage, data 147 has been converted from the first format stored in page 145 at source server 110 into the third format stored in page 149 at target server 120. The third format for data 147 is the same format when data 147 is saved from cache 127 to data table 142. When data migration from database 103 to database 107 is a heterogeneous migration, the third format for data 147 can be different from the first format of data 147. For example, data 147 contained in page 149 or data table 142 can have a second page size of a second page of a second data table, a second charset, or a second sort order for data table 142 contained in database 107. The second page size of a second page of a second data table, a second charset, or a second sort order for data table 142 contained in database 107 can be different from the first page size of the first page of the first data table, the first charset, or the first sort order for the first data table, e.g., data table 141 of database 103.

In some examples, when database management coordinator 121 is in transmission state 225, database management coordinator 121 can receive an indication, e.g., a suspend signal, to enter pause state 227. When database management coordinator 121 receives such an indication, database management coordinator 121 can suspend operations being performed. For example, database management coordinator 121 can suspend receiving any new message 146, and further store a status of data 147 being received. In some examples, database management coordinator 121 can suspend converting data 147 contained in message 148 into the third format, store data 147 in the third format into page 149 of cache 127. In some other examples, database management coordinator 121 can suspend receiving any new message 146, but continue to convert data 147 contained in message 148 into the third format, store data 147 in the third format into page 149 of cache 127. Other status, such as the status of the transmission queue 125, the status of page 149 can be saved as well. After saving the status, database management coordinator 121 can enter pause state 227 from transmission state 225.

In some examples, when database management coordinator 121 is in pause state 227, database management coordinator 121 can receive an indication, e.g., a resume signal, to enter transmission state 225. Once such an indication is received, database management coordinator 121 can restore the status of data 147 being received in message 148, and any other saved status, and further enter transmission state 225 from pause state 227. Once in transmission state 225, database management coordinator 121 can receive message 146 transmitted from source server 110 and save the received message as message 148 into buffer 126. Hence, pause state 227 can save data transmission already done before database management coordinator 121 enters pause state 227, and improve the efficiency and reliability of data migration from source server 110 to target server 120.

In some examples, when database management coordinator 121 is in pause state 227 or transmission state 225, database management coordinator 121 can receive an indication, e.g., a stop signal, to enter ready state 223. Once such an indication is received, database management coordinator 121 can stop receiving any new message 146, stop converting data 147 contained in message 148 into the third format, and stop storing data 147 in the third format into page 149 of cache 127. Afterwards, database management coordinator 121 can enter ready state 223.

In some examples, when database management coordinator 121 is in ready state 223, database management coordinator 121 can receive an indication, e.g., a cleanup signal, to enter initial state 221. Once such an indication is received, database management coordinator 121 can free the allocated resources for receiving any new message 146 and for converting data 147 contained in message 148 into the third format, e.g., buffer 126 and transmission queue 125. In addition, database management coordinator 121 can disconnect data channel 135, and enter initial state 221 after the resources have been freed and the data channel has been disconnected.

Operations described above for database management coordinator 111 of source server 110, and database management coordinator 121 of target server 120 are provided separately for each database management coordinator. Furthermore, operations are performed in parallel by both database management coordinators. Examples of such parallel operations are described in FIG. 3 below.

Figure 3:
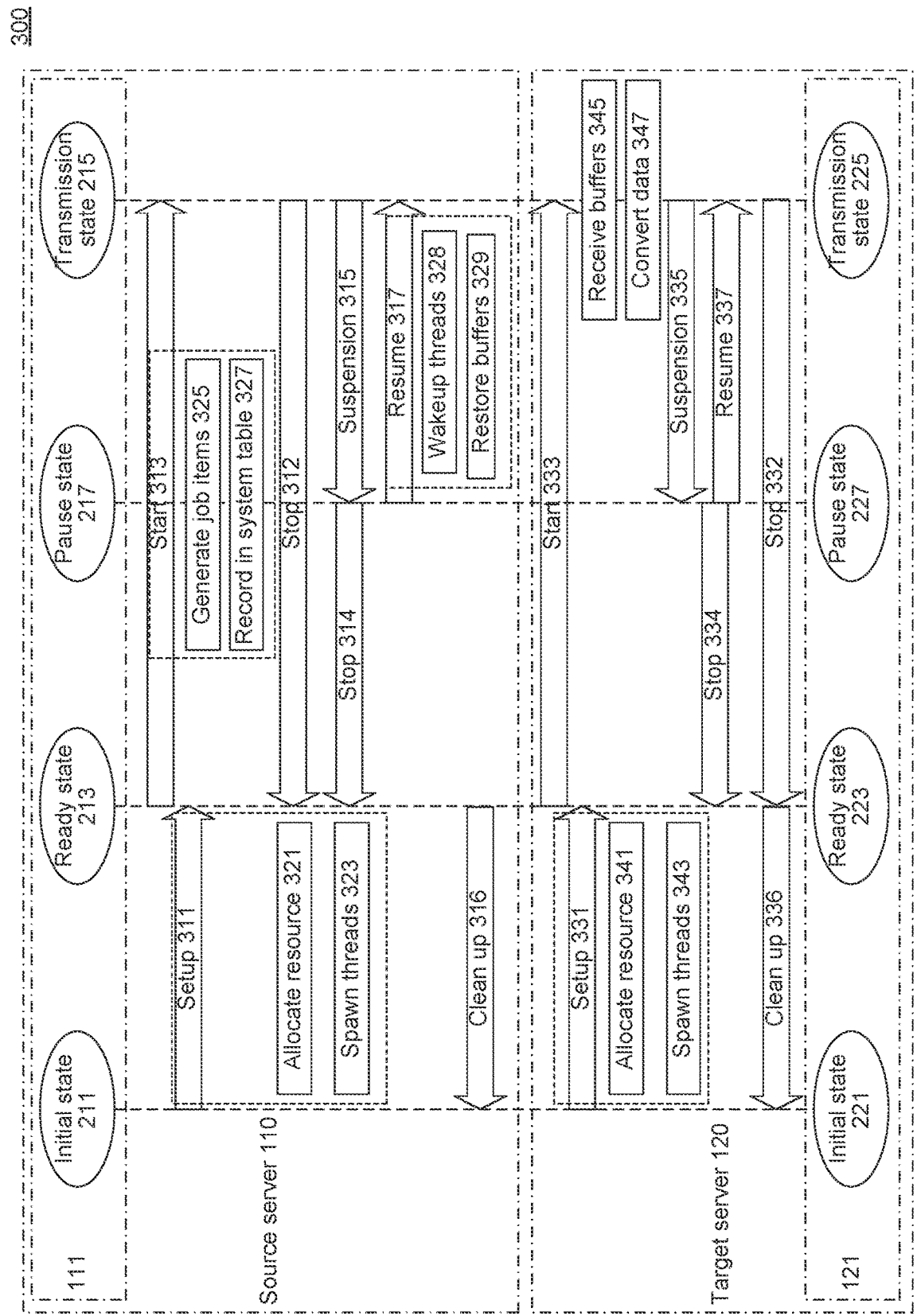
FIG. 3 illustrates an example sequence diagram illustrating various operations performed during different states for database management coordinators of a source server and a target server, according to some embodiments.

FIG. 3 illustrates an example sequence diagram 300 illustrating various operations performed during different states of the database management coordinators, e.g., database management coordinator 111 of source server 110, and database management coordinator 121 of target server 120. FIG. 3 shows operations performed by database management coordinator 111 and database management coordinator 121 in coordinated ways. Database management coordinator 111 can be in initial state 211, ready state 213, transmission state 215, or pause state 217, as shown in FIG. 2A. Database management coordinator 121 can be in initial state 221, ready state 223, transmission state 225, or pause state 227, as shown in FIG. 2B.

At the beginning, database management coordinator 111 can be in initial state 211, and database management coordinator 121 can be in initial state 221. At transaction 311, database management coordinator 111 can enter ready state 213 from initial state 211. During transaction 311, various operations can be performed, e.g., operation 321 to allocate resources such as buffer 116 and transmission queue 115, and operation 323 to spawn multiple threads to start the process of extracting data 147 from page 145 in cache 117. Similarly, and in a coordinated way, at transaction 331, database management coordinator 121 can enter ready state 223 from initial state 221. During transaction 331, various operations can be performed, e.g., operation 341 to allocate resources such as buffer 126 and transmission queue 125, and operation 343 to spawn multiple threads to start the process of converting data 147 from message 148 to be saved into page 149 in cache 127.

At transaction 313, which can be a start transaction, database management coordinator 111 can enter transmission state 215 from ready state 213. Various operations can be performed during transaction 313, e.g., operations 325 to generate job items to extract data 147 from page 145, convert data 147 into the second format contained in message 146, transmit message 146 to target server 120, and operations 327 to record the transmissions in system table. After entering transmission state 215, various operations can be performed by database management coordinator 111, e.g., transmitting message 146, extracting data 147 from page 145 to be included in message 146, as described for FIG. 2A.

At transaction 333, which can be a start transaction, database management coordinator 121 can enter transmission state 225 from ready state 223. Various operations can be performed during transaction 333, as described for FIG. 2B. After database management coordinator 121 enters transmission state 225, various operations can be performed, e.g., operations 345 to receive messages to save message 148 into buffer 126, and operations 347 to convert data 147 contained in message 148 to be stored in page 149.

At transaction 315, which can be a suspension transaction, database management coordinator 111 can enter pause state 217 from transmission state 215. At transaction 335, which can be a suspension transaction, database management coordinator 121 can enter pause state 227 from transmission state 225. Various operations can be performed during transaction 315 and transaction 335, as described for FIGS. 2A-2B.

At transaction 317, which can be a resume transaction, database management coordinator 111 can enter transmission state 215 from pause state 217. Various operations can be performed during transaction 317, such as operation 328 to wakeup various threads used during transmission state 215, and operation 329 to restore the status of buffer 116. At transaction 337, which can be a resume transaction, database management coordinator 121 can enter transmission state 225 from pause state 227. Various operations can be performed during transaction 317 and transaction 337, as described for FIGS. 2A-2B.

At transaction 312, database management coordinator 111 can enter ready state 213 from transmission state 215. At transaction 314, database management coordinator 111 can enter ready state 213 from pause state 217. At transaction 332, database management coordinator 121 can enter ready state 223 from transmission state 225. At transaction 334, database management coordinator 121 can enter ready state 223 from pause state 227. Various operations can be performed during transaction 312, transaction 314, transaction 332, and transaction 334, as described for FIGS. 2A-2B.

At transaction 316, database management coordinator 111 can enter initial state 211 from ready state 213. Various operations, e.g., cleanup operations as described in FIG. 2A, can be performed during transaction 316. At transaction 336, database management coordinator 121 can enter initial state 221 from ready state 223. Various operations, e.g., cleanup operations as described in FIG. 2B, can be performed during transaction 336.

Figure 4A:
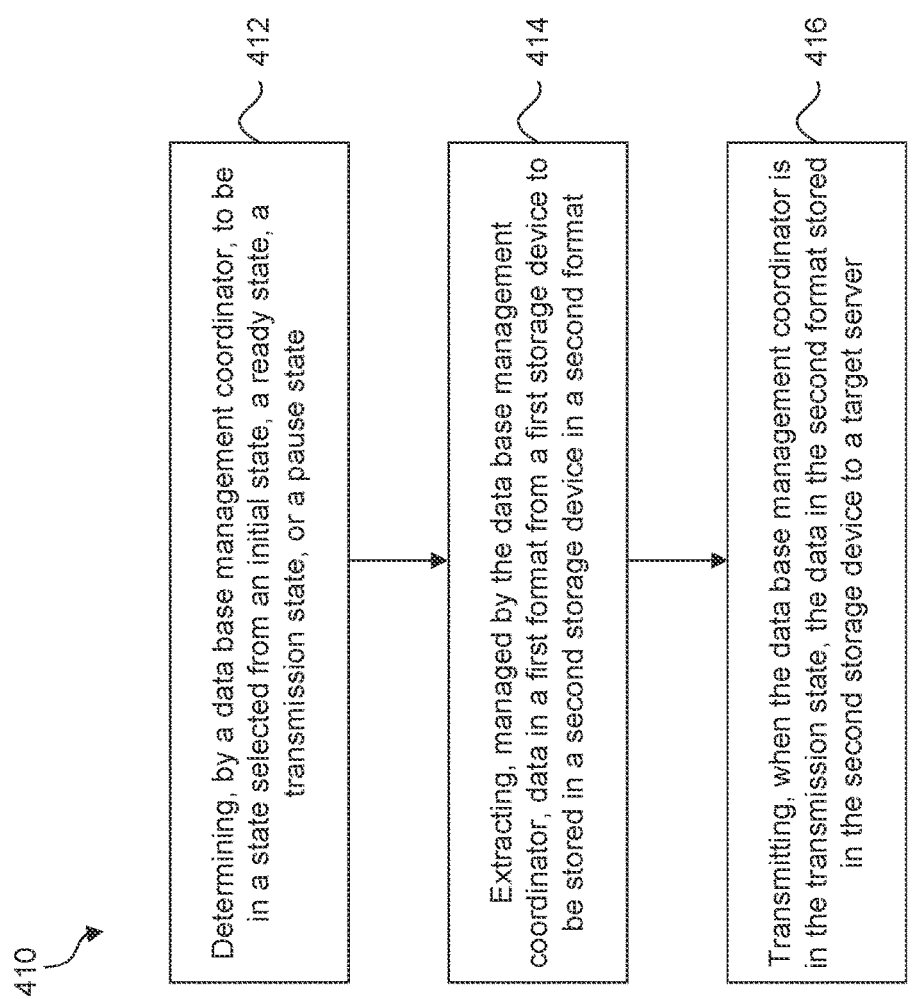
FIGS. 4A-4C illustrate example processes performed by database management coordinators of a source server and a target server, according to some embodiments.
Figure 4B:
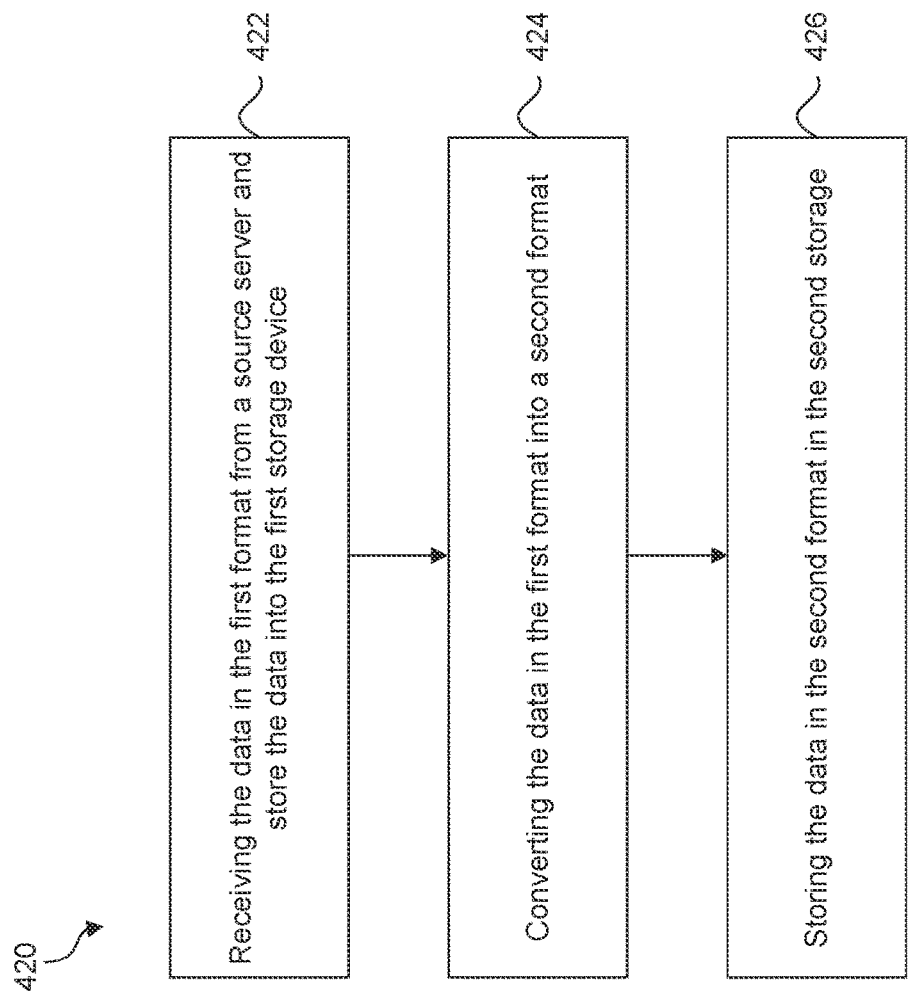
Figure 4C:
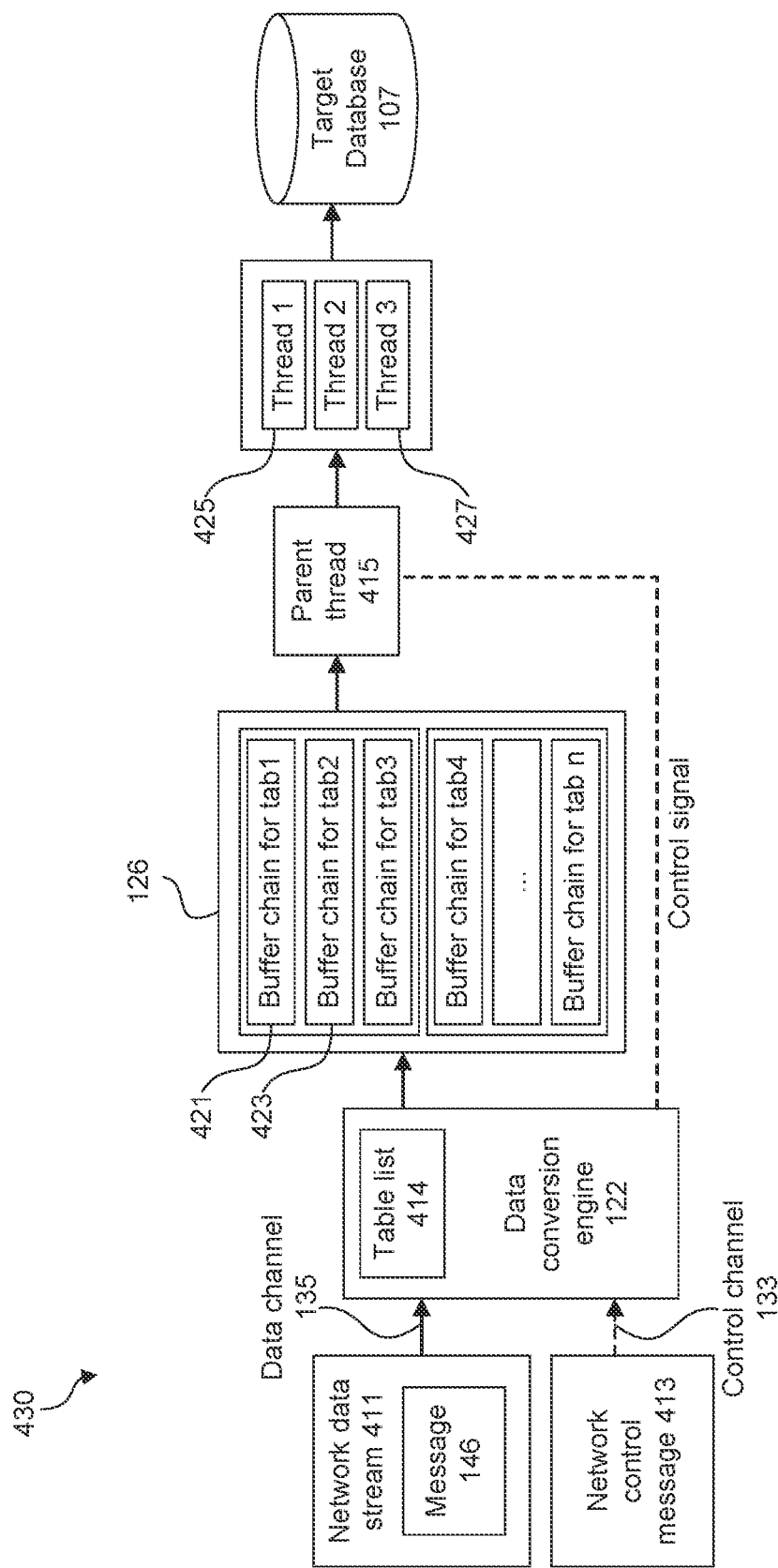

FIGS. 4A-4C illustrate example processes performed by database management coordinators of a source server and a target server, according to some embodiments. FIG. 4A illustrates process 410 performed by database management coordinator 111 of source server 110. FIG. 4B illustrates process 420 performed by database management coordinator 121 of target server 120. FIG. 4C illustrates process 430 performed by database management coordinator 121 of target server 120, which shows more details of process 420. Processes 410, 420, and 430 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 4A-4C, as will be understood by a person of ordinary skill in the art.

FIG. 4A illustrates process 410 performed by database management coordinator 111 of source server 110, as shown in FIG. 1.

At 412, database management coordinator 111 can determine to be in a state selected from an initial state, a ready state, a transmission state, or a pause state. For example, database management coordinator 111 can determine to be in initial state 211, ready state 213, transmission state 215, or pause state 217, as shown in FIG. 2A.

At 414, database management coordinator 111 can extract data in a first format from a first storage device to be stored in a second storage device in a second format. For example, database management coordinator 111 can extract data 147 in the first format contained in page 145 stored in cache 117. Database management coordinator 111 or its component, data extraction engine 112, can read data 147 in the first format stored in cache 117, convert data 147 in the first format into the second format as contained in message 146, and store data 147 in the second format in buffer 116. Database management coordinator 111 can extract data in the first format when database management coordinator 111 is in ready state 213, or transmission state 215, or in some other states. Hence, database management coordinator 111 can extract data 147 when database management coordinator 111 is in an online status, e.g., transmission state 215, or offline status, e.g., a state other than transmission state 215.

At 416, when data base management coordinator 111 is in transmission state 215, database management coordinator 111 can transmit, the data in the second format stored in the second storage device to a target server. For example, when data base management coordinator 111 is in transmission state 215, database management coordinator 111 can transmit data 147 in the second format contained in message 146 and stored in buffer 116 to target server 120.

FIG. 4B illustrates process 420 performed by database management coordinator 121 of target server 120, as shown in FIG. 1. Process 420 can be performed by database management coordinator 121 when database management coordinator 121 is in transmission state 225.

At 422, database management coordinator 121 can receive the data in the first format from a source server and store the data into the first storage device. For example, database management coordinator 121 can receive data 147 contained in message 146, and store the received message into buffer 126 to become message 148, where message 148 contains data 147. The format for message 148 can be the same as the format for message 146.

At 424, database management coordinator 121 can convert the data in the first format into a second format. For example, database management coordinator 121 can convert data 147 contained in message 148 to a format suitable to be stored in a page of a database, e.g., to be placed in page 149 and further stored into data table 142 of database 107.

At 426, database management coordinator 121 can store the data in the second format in the second storage. For example, database management coordinator 121 can store data 147 in page 149, where data 147 is in the format suitable to be stored in a page of a database, e.g., to be placed into data table 142 of database 107. Database management coordinator 121 can further store data 147 into data table 142 of database 107.

Operations for process 410 and process 420 listed above are provided for illustrative purposes only, and are not limiting. Other operations (not listed) can be alternatively or additionally used. In some examples, data migration from database 103 to database 107 can include three phases. During the first phase, source server 110 can send metadata of database 103, e.g., objects schema, index information, and more, to target server 120, and target server 120 can create objects as source server 110, which are not shown. During the second phase, database management coordinator 111 and database management coordinator 121 can perform the data page migration, as shown in process 410 and process 420. During the third phase after performing process 410 and process 420, database management coordinator 111 and database management coordinator 121 can perform database catchup operations for data changes in database 103 during the data migration process. In addition, there can be security related operations such as authentication of the target server and the source server, not shown.

FIG. 4C illustrates process 430 which is an example operational implementation of 424 shown in FIG. 4B.

A shown in FIG. 4C, a sequence of message 146 can form a network data stream 411 passing through data channel 135, received by transmission queue (not shown), and further processed by data conversion engine 122. In addition, network control message 413 can be received by data conversion engine 122 through control channel 133. Data conversion engine 122 can further receive a data table list 414 including the data tables being migrated from a source database, e.g., database 103, to a target database, e.g., database 107. Data conversion engine 122 can distribute received message 146 into multiple buffer chains, e.g., buffer chain 421, buffer chain 423, within buffer 126. Buffer chain 421 can be allocated for data belonging to a first data table, and buffer chain 423 can be allocated for data belonging to a second data table. In addition, data conversion engine 122 can generate a parent thread 415 to coordinate multiple child threads, e.g., a thread 425, a thread 427, so that a child thread is assigned to manage the data conversion for a data table. For example, thread 425 manages the conversion of data contained in buffer chain 421 for the first data table, and thread 427 manages the conversion of data contained in buffer chain 423 for the second data table. The data converted in a new format is further stored in database 107.

Figure 5:
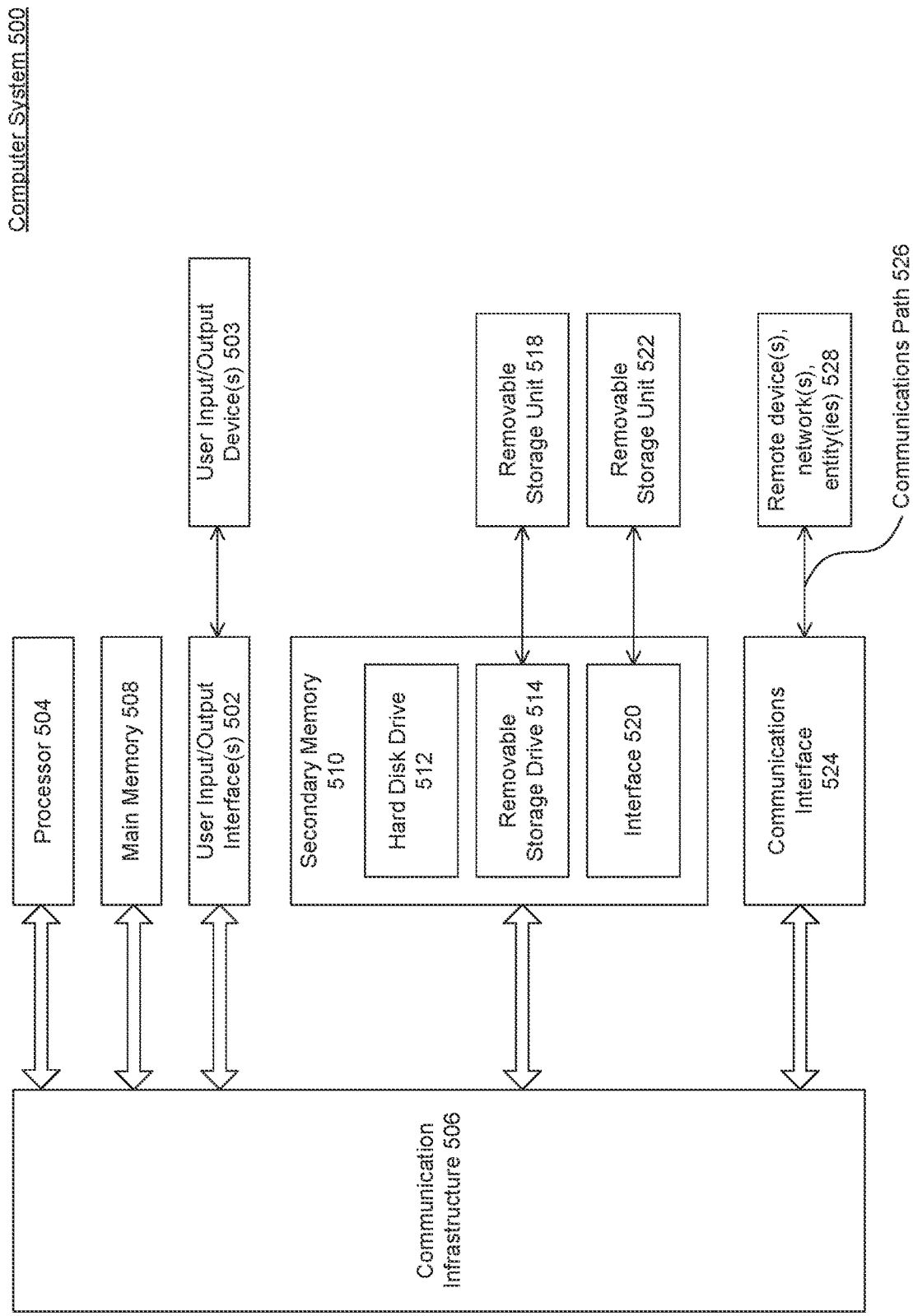
FIG. 5 is an example computer system useful for implementing various embodiments.

Various embodiments can be implemented, for example, using one or more computer systems, such as computer system 500 shown in FIG. 5. Computer system 500 can be used, for example, to implement processes 410, 420, and 430 of FIGS. 4A-4C. For example, computer system 500 can implement and execute a set of instructions comprising operations for data transmission from a first database to a second database, as outlined in any of FIGS. 1A-1B, FIGS. 2A-2B, FIG. 3, and FIGS. 4A-4C. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for a source server, comprising:

determining, by a database management coordinator operated by the source server, to be in a state selected from an initial state, a ready state, a transmission state, or a pause state;

extracting, managed by the database management coordinator, data in a first format stored in a first storage device, wherein the extracting the data in the first format includes reading the data in the first format, converting the data in the first format into a second format, and storing the data in the second format in a second storage device; and transmitting, when the database management coordinator is in the transmission state, the data in the second format stored in the second storage device to a target server, wherein the second format includes a message header of a message containing the data to be transmitted from the source server to the target server, and the data in the second format is received by the target server to be converted into a third format different from the first format and the second format.

2. The method of claim 1, wherein the extracting the data in the first format comprises:
   extracting a first data in a first row of a first data table of a database;
   extracting a second data in a second row of the first data table; and
   extracting a third data in a second data table of the database.

3. The method of claim 1, wherein the extracting the data in the first format stored in the first storage device comprises extracting the data in the first format stored in the first storage device by multiple threads in parallel managed by the database management coordinator.

4. The method of claim 1, wherein the first storage device includes a memory or a cache storage of the source server, and the second storage device includes one or more buffers;
   the first format for the data includes a first page size of a first page of a first data table, a first charset, or a first sort order for the first data table, wherein the data is contained in the first page of the first data table; and
   the third format for the data includes a second page size of a second page of a second data table, a second charset, or a second sort order for the second data table, wherein the data is converted into the third format to be stored in the second page of the second data table.

5. The method of claim 1, wherein the message header included in the second format for the data includes a database identifier or a source object identifier.

6. The method of claim 4, wherein the first page size of the first page of the first data table is of a size of 1 k, 2 k, 4 k, 8 k, or 16 k, and the second page size of the second page of the second data table is of a size different from the first page size.

7. The method of claim 1, further comprising:
   allocating, when the database management coordinator is in the initial state, resources for extracting the data in the first format and resources for transmitting the data in the second format from the source server to the target server;
   setting up, when the database management coordinator is in the initial state, a data connection between the source server and the target server; and
   entering the ready state after the resources have been allocated and the data connection has been setting up.

8. The method of claim 7, wherein the extracting the data in the first format comprises extracting the data in the first format after the database management coordinator enters the transmission state from the ready state.

9. The method of claim 7, further comprising:
   receiving, when the database management coordinator is in the transmission state, an indication to enter the pause state;
   suspending the extracting the data in the first format;
   suspending the transmitting the data in the second format stored in the second storage device to the target server;
   storing a status of the data being transmitted in the second format; and
   entering the pause state from the transmission state.

10. The method of claim 9, further comprising:
    receiving, when the database management coordinator is in the pause state, another indication to enter the transmission state;
    restoring the status of the data being transmitted in the second format;
    entering the transmission state from the pause state; and
    transmitting, when the database management coordinator is in the transmission state, the data in the second format to the target server.

11. The method of claim 10, further comprising:
    receiving, when the database management coordinator is in the pause state or the transmission state, a third indication to enter the ready state;
    stopping the extracting the data in the first format;
    stopping the transmitting the data in the second format to the target server; and
    entering the ready state.

12. The method of claim 7, further comprising:
    receiving, when the database management coordinator is in the ready state, an indication to enter the initial state;
    freeing the allocated resources for extracting the data in the first format and resources for transmitting the data in the second format from the source server to the target server;
    disconnecting data connection between the source server and the target server; and
    entering the initial state after the resources have been freed and the data connection has been disconnected.

13. A system for a target server, comprising:
    a first storage device to store data in a first format;
    a second storage device to store the data in a second format;
    at least one processor coupled to the first storage device and the second storage device; and
    a database management coordinator operated by the at least one processor to be in a state selected from an initial state, a ready state, a transmission state, or a pause state, wherein when the database management coordinator is in the transmission state, the database management coordinator is configured to:
      receive the data in the first format from a source server and store the data in the first format into the first storage device;
      convert the data in the first format into the second format; and
      store the data in the second format in the second storage device, wherein the data in the second format is converted by the source server from a third format stored in a third storage device associated with the source server to the first format before transmitting to the target server, the first format includes a message header of a message containing the data received from the source server, and wherein the second format is different from the first format and the third format.

14. The system of claim 13, wherein the first storage device includes one or more buffers, and the second storage device includes a memory or a cache storage;
    the second format for the data includes a first page size of a first page of a first data table, a first charset, or a first sort order for the first data table, wherein the data is contained in the first page of the first data table; and
    the third format for the data stored in the third storage device associated with the source server includes a second page size of a second page of a second data table, a second charset, or a second sort order for the second data table, wherein the data is contained in the second page of the second data table before being transmitted to the target server.

15. The system of claim 14, wherein the first page size of the first page of the first data table is of a size 1 k, 2 k, 4 k, 8 k, or 16 k, and the second page size of the second page of the second data table is of a size different from the first page size.

16. The system of claim 13, wherein the database management coordinator is configured to convert the data in the first format into the second format and stored in the second storage device by multiple parallel threads managed by the database management coordinator.

17. The system of claim 13, wherein the database management coordinator is further configured to:
- allocate, when the database management coordinator is in the initial state, resources for receiving the data in the first format from the source server and storing the data into the first storage device, and resources for converting the data in the first format into the second format;
- set up, when the database management coordinator is in the initial state, a data connection between the source server and the target server; and
- enter the ready state after the resources for receiving the data and the resources for converting the data have been allocated and the data connection has been setting up.

18. The system of claim 17, wherein the database management coordinator is further configured to:
- receive, when the database management coordinator is in the transmission state, an indication to enter the pause state;
- suspend the receiving the data in the first format from the source server;
- store a status of the data being received in the first format;
- enter the pause state from the transmission state;
- receive, when the database management coordinator is in the pause state, another indication to enter the transmission state;
- restore the status of the data being received in the first format;
- enter the transmission state from the pause state;
- receive, when the database management coordinator is in the pause state or the transmission state, a third indication to enter the ready state;
- stop the receiving the data in the first format from the source server; and
- enter the ready state.

19. A non-transitory computer-readable medium having instructions stored thereon that, when executed by at least one computing device, cause the at least one computing device to perform operations comprising:
- determining, by a database management coordinator operated by the at least one computing device, to be in a state selected from an initial state, a ready state, a transmission state, or a pause state;
- extracting, managed by the database management coordinator, data in a first format stored in a first storage device, wherein the extracting the data in the first format includes reading data in the first format in the first storage device, converting the data in the first format into a second format, and storing the data in the second format in a second storage device; and
- transmitting, when the database management coordinator is in the transmission state, the data in the second format stored in the second storage device to a target server, wherein the second format includes a message header of a message containing the data to be transmitted from the source server to the target server, and the data is received by the target server in the second format to be converted into a third format different from the first format and the second format.

20. The non-transitory computer-readable medium of claim 19, wherein:
- the first storage device includes a memory or a cache storage of the at least one computing device;
- the second storage device includes one or more buffers;
- the first format for the data includes a first page size of a first page of a first data table, a first charset, or a first sort order for the first data table, wherein the data is contained in the first page of the first data table; and
- the third format for the data includes a second page size of a second page of a second data table, a second charset, or a second sort order for the second data table, wherein the data is converted into the third format to be stored in the second page of the second data table.

* * * * *